United States Patent
Gandhi et al.

(10) Patent No.: US 10,862,785 B2
(45) Date of Patent: Dec. 8, 2020

(54) METHODS, SYSTEMS AND DEVICES FOR MONITORING AND MANAGING NETWORK-CONNECTED DEVICE USAGE

(71) Applicant: The Toronto-Dominion Bank, Toronto (CA)

(72) Inventors: Rajeev Kumar Gandhi, Toronto (CA); Julie Anne Cassidy, Toronto (CA); Ann Cynthia Eapen, Toronto (CA); John Jong-Suk Lee, Toronto (CA); Rakesh Thomas Jethwa, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

(21) Appl. No.: 16/426,291

(22) Filed: May 30, 2019

(65) Prior Publication Data
US 2019/0280955 A1    Sep. 12, 2019

Related U.S. Application Data

(63) Continuation of application No. 15/594,912, filed on May 15, 2017, now Pat. No. 10,355,958.

(51) Int. Cl.
| | |
|---|---|
| *H04L 12/26* | (2006.01) |
| *H04L 29/08* | (2006.01) |
| *H04W 24/08* | (2009.01) |
| *H04L 12/14* | (2006.01) |
| *H04M 15/00* | (2006.01) |

(52) U.S. Cl.
CPC .......... *H04L 43/0876* (2013.01); *H04L 12/14* (2013.01); *H04L 43/045* (2013.01); *H04L 43/0894* (2013.01); *H04L 67/36* (2013.01); *H04M 15/00* (2013.01); *H04M 15/58* (2013.01); *H04M 15/59* (2013.01); *H04M 15/8083* (2013.01); *H04M 15/83* (2013.01); *H04M 15/853* (2013.01); *H04W 24/08* (2013.01)

(58) Field of Classification Search
CPC ............... H04L 43/0876; H04L 43/045; H04L 43/0894; H04L 12/14; H04M 15/00; H04M 15/58; H04M 15/59; H04M 15/8083; H04M 15/83; H04M 15/853; H04W 24/08
See application file for complete search history.

(56) References Cited

U.S. PATENT DOCUMENTS

| | | | |
|---|---|---|---|
| 8,743,703 B2 | 6/2014 | Heinz et al. | |
| 9,134,353 B2 | 9/2015 | Jia et al. | |
| 9,681,490 B1 | 6/2017 | Kakinada et al. | |
| 10,355,958 B2 * | 7/2019 | Gandhi | H04L 12/14 |

* cited by examiner

*Primary Examiner* — Bryan Bui
(74) *Attorney, Agent, or Firm* — Duane Morris LLP

(57) ABSTRACT

The present application provides monitoring and managing usage of one or more network-connected devices over a network. The network-connected devices may include devices connected to the Internet of Things (IoT). Some aspects provide systems, methods and computing devices for: receiving usage and rate data associated with network-connected device(s); determining device expenditure data based on the usage and rate data; obtaining allocation information pertaining to a time period; updating information associated with one or more data files with the device expenditure data; comparing the updated information to the allocation information; and determining whether an allocation indicated by the allocation information for the time period is feasible.

20 Claims, 7 Drawing Sheets

METHODS, SYSTEMS AND DEVICES FOR MONITORING AND MANAGING NETWORK-CONNECTED DEVICE USAGE

CROSS-REFERENCE TO RELATED APPLICATION

This application is a continuation of and claims the benefit of priority to U.S. application Ser. No. 15/594,912, filed May 15, 2017, the disclosure of which is incorporated herein by reference in its entirety.

TECHNICAL FIELD

The following relates generally to methods and devices for monitoring and managing usage of network-connected devices. More specifically, the following relates to methods and devices for monitoring and managing usage of network-connected devices in accordance with allocations.

BACKGROUND

Increasingly, devices, machines, and the like, such as automobiles, light fixtures, and refrigerators, are becoming network-connected devices to allow for their management (such as by, e.g., turning a device on or off, adjusting power output, updating firmware or software, etc.). Such network-connected devices may be connected to any wired or wireless network of any type or size, including the Internet. The recent emergence of network-connected devices has resulted in a networked "web" of devices known as the "Internet of Things" (IoT). In order to among other things help manage household budgets, there is a need for a real-time ability to monitor and manage the usage of one or more household network-connected devices.

SUMMARY

In an aspect of the present application there is provided a computing device for monitoring and managing usage of one or more network-connected devices over a network. The computing device comprises: a memory storing computer-executable instructions; a communication module for communication with the one or more network-connected devices via the network; and at least one processor coupled to the memory and the communication module. The instructions when executed by the at least one processor cause the at least one processor to: receive via the communication module over the network usage data associated with at least one of the one or more network-connected devices, obtain rate data associated with the at least one of the one or more network-connected devices; determine, for the at least one of the one or more network-connected devices, device expenditure data based on the rate data and the usage data; obtain allocation information pertaining to a time period, the allocation information being in respect of at least the at least one of the one or more network-connected devices; receive via the communication module over the network from a server information, the information including data associated with one or more data files; update the information with the device expenditure data for the at least one of the one or more network-connected devices, to obtain updated information; compare the updated information to the allocation information; and determine, based on the comparison of the updated information to the allocation information, whether an allocation indicated by the allocation information for the time period is feasible.

In another aspect of the present application there is provided a method of monitoring and managing usage of one or more network-connected devices over a network by a computing device. The computing device comprises at least one processor coupled to a memory and a communication module. The method comprises: receiving via the communication module over the network usage data associated with at least one of the one or more network-connected devices; obtaining rate data associated with the at least one of the one or more network-connected devices; determining, for the at least one of the one or more network-connected devices, device expenditure data based on the rate data and the usage data; obtaining allocation information pertaining to a time period, the allocation information being in respect of at least the at least one of the one or more network-connected devices; receiving via the communication module over the network from a server information, the information including data associated with one or more data files; updating the information with the device expenditure data for the at least one of the one or more network-connected devices, to obtain updated information; comparing the updated information to the allocation information; and determining, based on the comparison of the updated information to the allocation information, whether an allocation indicated by the allocation information for the time period is feasible.

In yet another aspect of the present application there is provided a non-transitory computer-readable medium for monitoring and managing usage of one or more network-connected devices over a network. The computer-readable medium comprises computer-executable instructions for: receiving over the network usage data associated with at least one of the one or more network-connected devices; obtaining rate data associated with the at least one of the one or more network-connected devices; determining, for the at least one of the one or more network-connected devices, device expenditure data based on the rate data and the usage data; obtaining allocation information pertaining to a time period, the allocation information being in respect of at least the at least one of the one or more network-connected devices; receiving over the network from a server information, the information including data associated with one or more data files; updating the information with the device expenditure data for the at least one of the one or more network-connected devices, to obtain updated information; comparing the updated information to the allocation information; and determining, based on the comparison of the updated information to the allocation information, whether an allocation indicated by the allocation information for the time period is feasible.

BRIEF DESCRIPTION OF THE DRAWINGS

Aspects of the application will now be described by way of example only with reference to the appended drawings in which.

DETAILED DESCRIPTION

Figure 1:
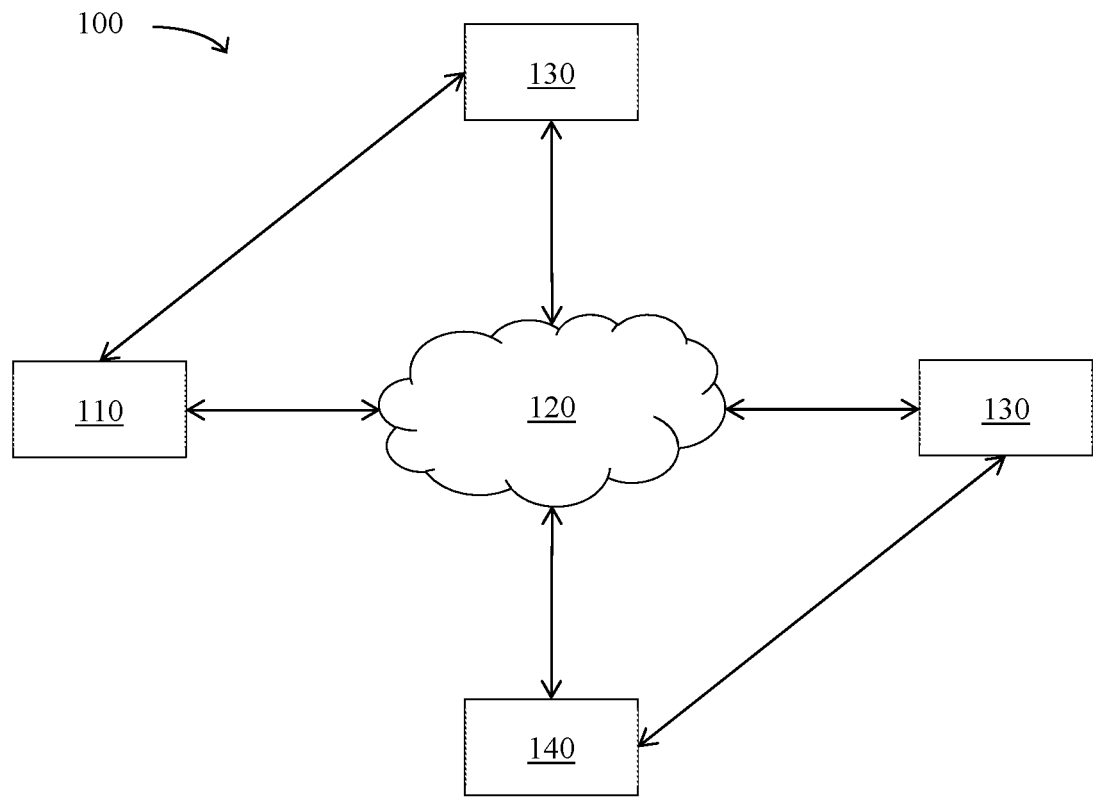
FIG. 1 depicts a schematic diagram of an exemplary aspect of a system described herein.

It will be appreciated that for simplicity and clarity of illustration, where considered appropriate, reference numerals may be repeated among the figures to indicate corresponding or analogous elements. In addition, numerous specific details are set forth in order to provide a thorough understanding of the exemplary aspects of the present application described herein. However, it will be understood by those of ordinary skill in the art that the exemplary aspects described herein may be practised without these specific details. In other instances, well-known methods, procedures and components have not been described in detail so as not to obscure the exemplary aspects described herein. Also, the description is not to be considered as limiting the scope of the exemplary aspects described herein. Any systems, method steps, components, parts of components, and the like described herein in the singular are to be interpreted as also including a description of such systems, method steps, components, parts of components, and the like in the plural, and vice versa.

Network-connected objects, devices, machines, things, etc., connected to a network such as the Internet, are typically capable of collecting and sharing data with other connected devices or servers using any of the communication protocols that have been developed for or that are suitable for use or usable with IoT devices, such as more traditional web protocols like TCP/IP, and newer protocols catered to IoT device communication, such as Constrained Application Protocol (CoAP) or Message Queue Telemetry Transport (MQTT).

In order to help manage household budgets, there is a need for a real-time ability to monitor and manage the usage of one or more household network-connected devices, including, for example, appliances such as clothes washers and dryers, dishwashing machines, slow-cookers, and the like, and other household devices such as furnaces, fireplaces, refrigerators, light fixtures, water tanks, thermostats, and any other electricity-, water- or gas- (collectively, "utility") consuming device.

It can be difficult to manage household budgets and in particular, the costs associated with the use of devices that consume such utilities. Part of the difficulty in managing these costs is that utilities are typically billed in arrears, and as such, budgetary adjustments for a household budget tend to be reactionary, based on the prior billing cycle and the usage demands of that prior billing cycle's timeframe. For example, while the month of March may incur a high electricity or gas bill due to increased heating of a home, the month of April may require less heating in order to maintain the same home temperature, due to rising environmental temperatures. It can be difficult to work towards a budget in a reactionary manner as the coming period may impose different conditions and thus necessitate different device usage patterns, and further, waiting until the completion of a billing cycle to determine budgetary adjustments means that the excess device use has already taken place, and the related costs already incurred. Furthermore, while some people may prefer to cut costs by reducing, for example, their use of lighting, others may prefer to reduce water or gas use, so there is no "one size fits all" solution for reducing the costs associated with the use of such household devices.

A user of such devices may have or have access to (e.g., through a web portal) a software application from a financial institution, such as a bank, which monitors monetary debit and credit transactions in accounts of the user, aggregates and sorts the monitored account data, and provides to the user a report of the user's financial transactions for a certain time period. For example, such reports may show income and expenditures on a monthly basis, aggregated by industry or type (e.g., amount spent on food, gasoline, clothing, etc.). Such applications may also provide a mechanism for establishing a budget for a certain time period, in which case the reports may include information on whether a budget has been met, including information on the extent of variance from a budget. However, these applications do not account for real-time expenditures related to the use of network-connected devices, nor do they provide real-time budget tracking accounting for such usage of network-connected devices.

The present description generally relates to methods, systems and devices for monitoring and managing network-connected device usage in accordance with allocations. An allocation may be any manually or automatically pre-determined threshold for a parameter that affects the usage of one or more network-connected devices. As a non-limiting example, an allocation may include a maximum or minimum amount of gasoline consumption or distance of travel per day for a network-connected automobile. Other non-limiting examples of an allocation may include an amount of electricity usage, an amount of water usage, an amount of natural gas usage, or any combination thereof for, for example, household appliances, devices, apparatuses, and the like. As a further non-limiting example, an allocation may include an amount of money spent as a result of usage of household appliances. An allocation may be applied as a minimum or a maximum threshold, depending on the circumstances. For example, an automobile testing company may require that test vehicles on the IoT be road-tested for a certain minimum distance per unit of time, such as at least 100 miles/day. It will be appreciated by the person skilled in the art that there may be many other examples of allocations that may serve to affect the usage of one or more network-connected devices.

As used herein, the term "device" includes any device, machine, object, thing, or the like. As also used herein, the term "network-connected device" includes any device configured for, or capable of being adapted for, connection to a network, such as network-connected devices on the Internet of Things (IoT). It will be appreciated by the person skilled in the art that while certain network-connected devices presently exist, others may emerge in the future, and that the present disclosure includes all such network-connected devices and is in no way limited by the types of devices presently known by the skilled person to be connectable to a network. Furthermore, the person of skill in the art will appreciate that there are delays inherent to any form of communication, including wired or wireless digital communication, including over a digital network, and as such, as used herein, the term "real-time" includes real-time and substantially real-time communication.

Figure 2:
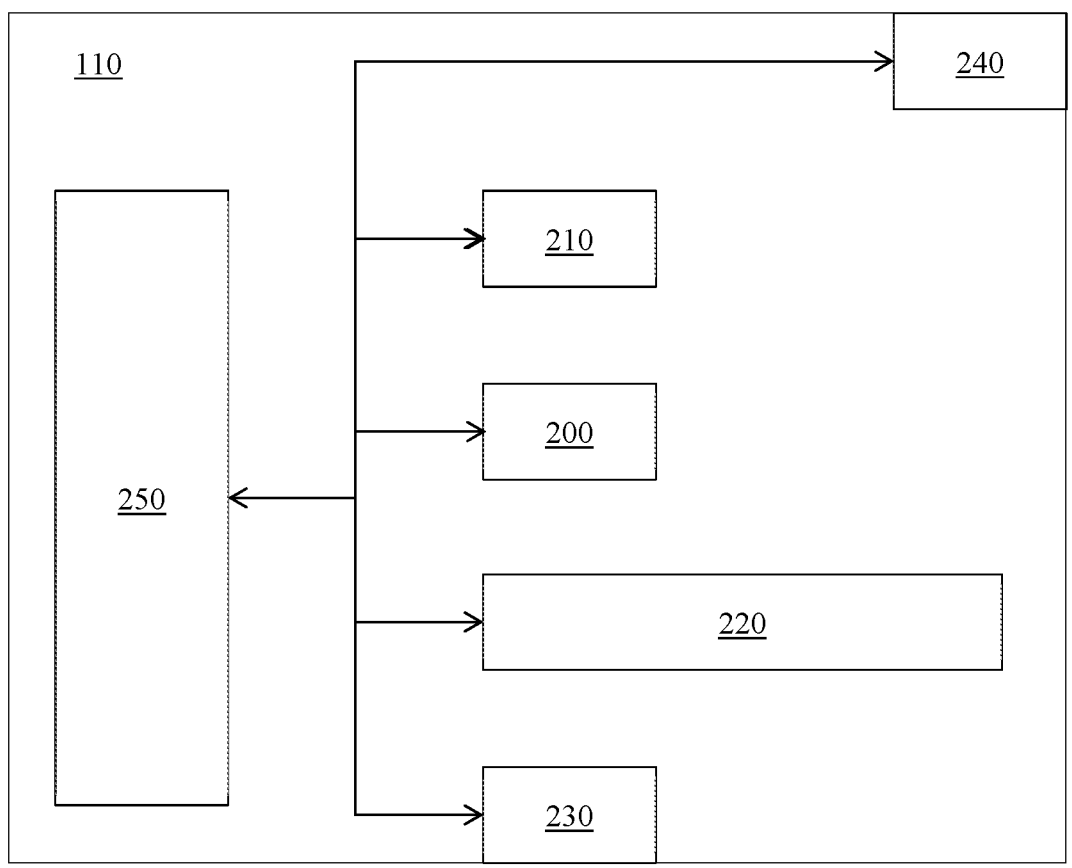
FIG. 2 depicts a schematic diagram of an exemplary aspect of a computing device described herein.

As an non-limiting example, in order to help manage a household budget, there is a need for a real-time ability to monitor and manage the usage of one or more household network-connected devices, including, for example, appliances such as clothes washers and dryers, dishwashing machines, slow-cookers, and the like, and other household devices such as furnaces, fireplaces, refrigerators, light fixtures, water tanks, thermostats, and any other electricity-, water- or gas- (collectively, "utility") consuming device. With reference to FIG. 1 and FIG. 2, system 100 includes one or more computing device(s) 110 for monitoring and managing the usage of one or more network-connected device(s) 130 over a network 120. Device(s) 130 may communicate directly with computing device(s) 110 or smart sensor(s) 300 (as described further below) or over network 120 via any of the network types and communication protocols described herein.

Computing device 110 may comprise memory 200, communication module 210, a display 220, one or more input devices 230, one or more sensors 240, and at least one processor 250 coupled to the memory 200, communication module 210, display 220, input device(s) 230, and sensor(s) 240. Communication module 210 enables computing device 110 to communicate with one or more other components of system 100, such as one or more network-connected devices 130, via a wired or wireless communication network, such as network 120. Network 120 may comprise a direct link between communicating components of system 100, or an indirect one, including but not limited to communication by Ethernet™, Bluetooth™, WiFi™, ZigBee™, Z-Wave™, 6LowPAN™, Thread™, NFC (near-field communication), SigFox™, infrared, WiMAX™ (fixed or mobile), RFID (radio-frequency identification), Neul™, LoRaWAN™, CoAP (Constrained Application Protocol), MQTT (Message Queue Telemetry Transport), and any suitable cellular communications protocols including, but not limited to, up to 5G protocols, such as GSM, GPRS, EDGE, CDMA, UMTS, LTE, LTE-A, IMS, for example, and any other communications protocols suitable for the method(s), system(s) and device(s) described herein, including any proprietary protocols. Network 120 may comprise a single network or more than one interconnected network, of any type suitable for the method(s), system(s) and device(s) described herein, including but not limited to wired or wireless PANs (personal area networks), LANs (local area networks), WANs (wide area networks), MANs (metropolitan area networks), mesh or ad hoc networks, VPNs (virtual private networks), the Internet, and any other suitable network type, in any suitable network configuration or topology (e.g., mesh, token ring, tree, star, etc.). Although not shown in FIG. 1, system 100 may further include any components necessary to effect the communication and/or network type(s) used, and may also include components for increased network security, for example, access points, routers, and firewalls.

Memory 200 may comprise a tangible and non-transitory computer-readable medium (i.e., a medium which does not comprise only a transitory propagating signal per se) comprising or storing computer-executable instructions, such as computer programs, sets of instructions, code, software, or data for execution by any processor(s) and/or microcontroller(s) described herein, including processor(s) 250, server processor(s) 620 and/or microcontroller(s) 340 (described further below). As used herein, the terms "processor", "processors" or "processor(s)" may refer to any combination of processor(s) 250, server processor(s) 620 and/or microcontroller(s) 340 suitable for carrying out method step(s) described herein. Memory 200 may comprise one or more of a local and/or remote hard disk or hard drive, of any type, ROM (read-only memory) and/or RAM (random-access memory), buffer(s), cache(s), flash memory, optical memory (e.g., CD(s) and DVD(s)), and any other form of volatile or non-volatile storage medium in or on which information may be stored for any duration. Such computer-executable instructions, when executed by the processor(s) of computing device(s) 110, server 140 and/or smart sensor(s) 300 (described further below) cause the processor(s) to perform any of the methods described herein, such as methods for monitoring and managing usage of network-connected device(s) over network 120. It will be appreciated that the method steps described herein may be implemented in a variety of programming languages.

Input device(s) 230 provide a mechanism for a user of system 100, and of computing device 110, to provide input(s) to computing device 110, such as during the execution of computer programs stored in memory 200. Input device(s) 230 may include a touch-sensitive display, physical or virtual keyboard, keypad, mouse, microphone, trackpad, scroll wheel or ball, or other suitable device capable of receiving or detecting an input. Display 220 may comprise any suitable touch-sensitive display, such as a capacitive, resistive, infrared, surface acoustic wave (SAW) touch-sensitive display, strain gauge, optical imaging, dispersive signal technology, acoustic pulse recognition, and so forth, as is known in the art. In such cases display 220 may also serve as an input device 230 of computing device 110.

Figure 3:
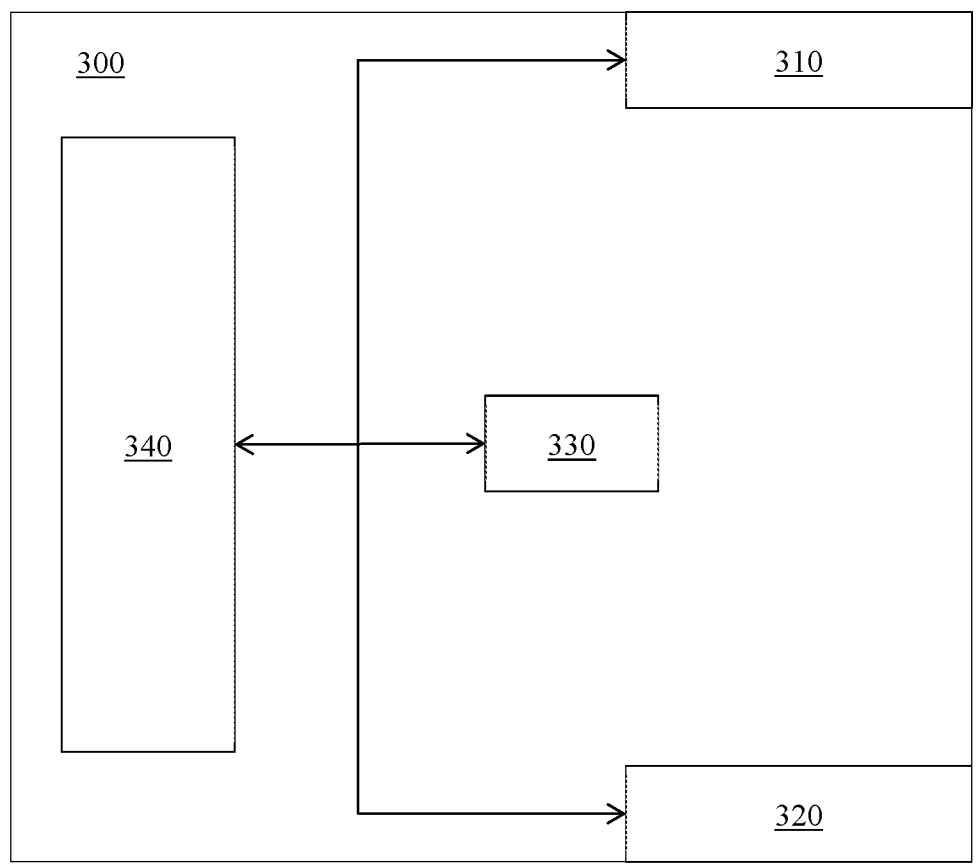
FIG. 3 depicts a schematic diagram of an exemplary aspect of a smart sensor described here.

Sensor(s) 240 may include an array of redundant sensors, and may comprise smart sensor(s) having onboard signal and data-processing capabilities, such as a microprocessor and other components, including band pass filters, amplifiers, and any other components which may be used to improve the quality of a received signal (such as by filtering out noise) before relaying information from the signals received to processor(s) for additional processing or interpretation. In some aspects, and with reference to FIG. 3, computing device 110 may include a smart sensor 300 having a transceiver 310 (or a separate transmitter and receiver), sensor 320, memory 330, and a microcontroller 340 coupled to the transceiver (or transmitter and receiver), sensor, and memory, and the memory may comprise or have stored thereon or therein computer-executable instructions that when executed carry out method step(s) described herein. In such aspects of the present application, method steps described herein requiring user input may be carried out through a client interface, such as a web portal, on any networked device, such as a tablet or desktop computer. Furthermore, while in certain aspects a software application running on computing device(s) 110 and/or smart sensor(s) 300 may interact with a separate software application running on server 140 in order to carry out method step(s) described herein, in other aspects, the software application running on computing device(s) 110 and/or smart sensor(s) 300 may be a client instance of a software application running on server 140.

Figure 6:
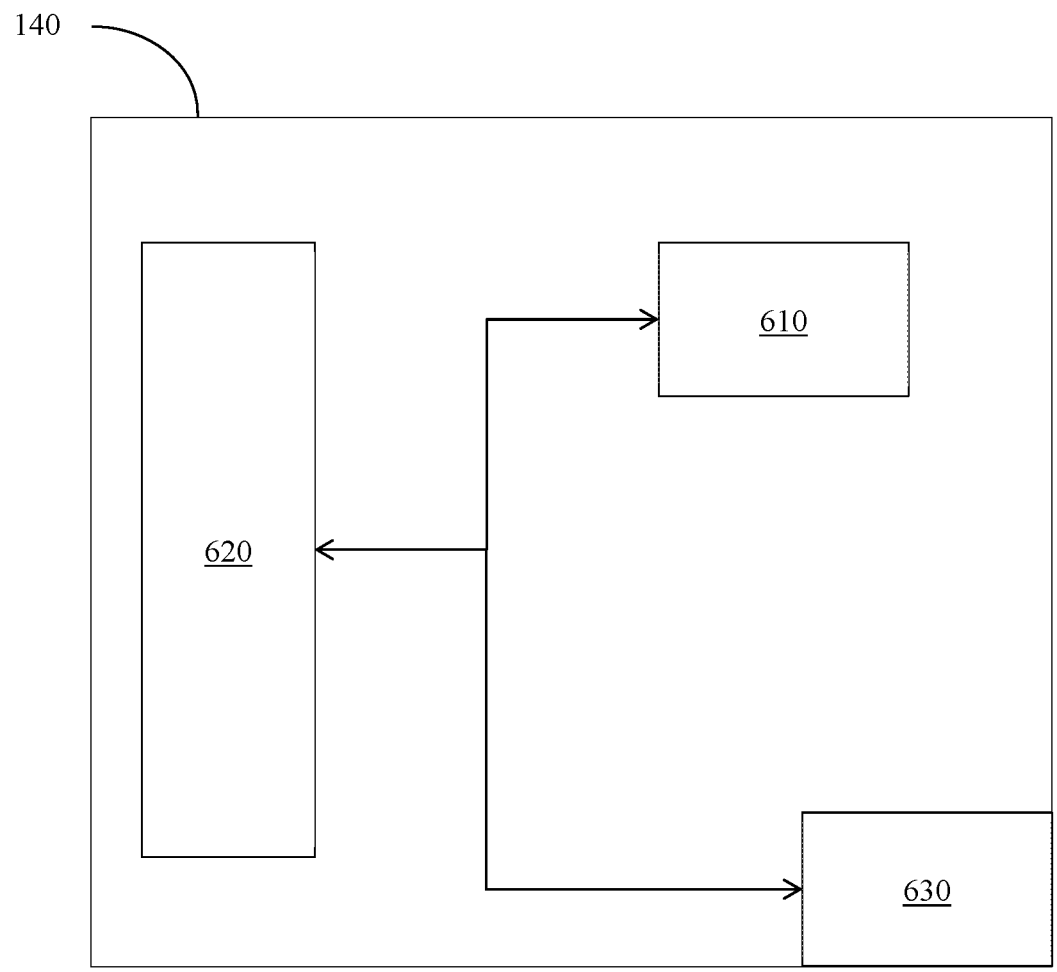
FIG. 6 depicts a schematic diagram of an exemplary aspect of a server described herein.

Referring to FIG. 6, server 140 has a server memory 610 comprising instructions that when executed by server processor(s) 620 cause the server processor(s) (and/or, in a distributed processing system, any of processor(s) 250 and microcontroller(s) 340) to carry out method step(s) described herein. Server 140 may further comprise other standard components as would be known by the skilled person in the art, such as server communication module 630 for communication with other connected devices or system components over network 120 by any known communication mechanisms, including those described herein.

Figure 4:
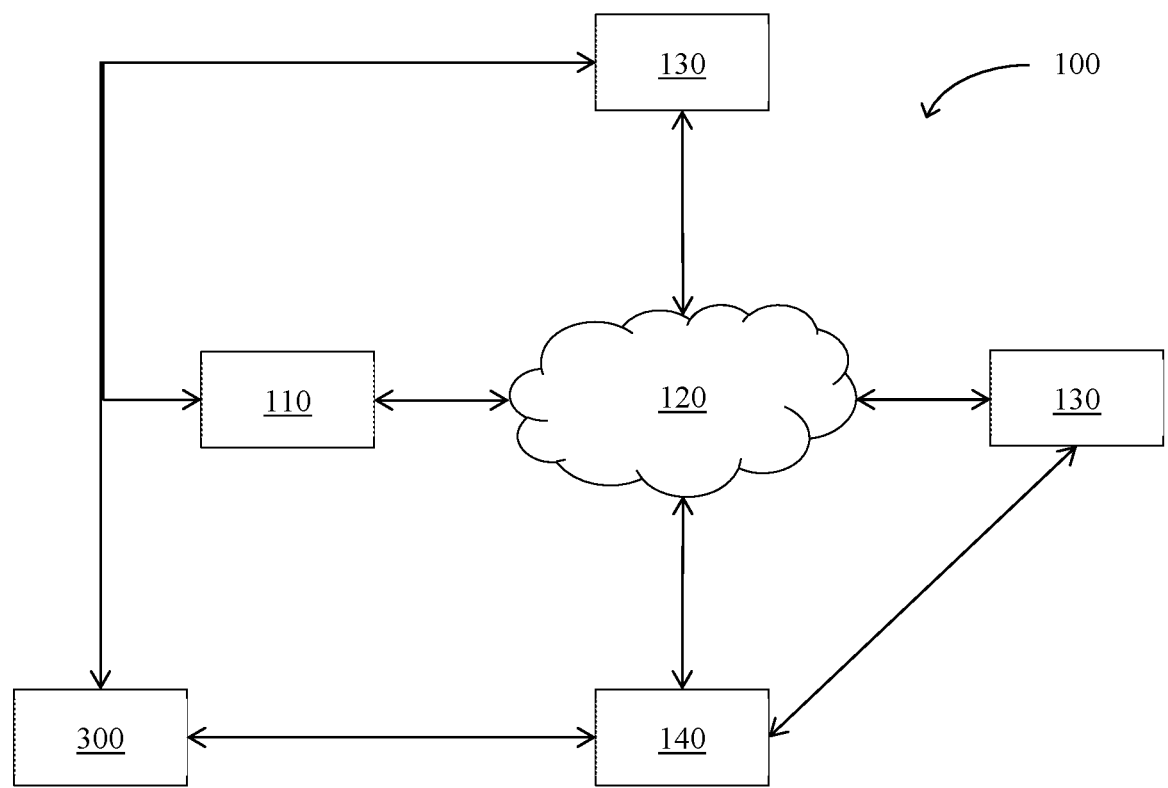
FIG. 4 depicts a schematic diagram of another exemplary aspect of a system described herein.

With reference to FIG. 4, system 100 may further comprise smart sensor(s) 300, which may be communicatively coupled to computing device(s) 110, server(s) 140 and/or network-connected device(s) 130. It will be appreciated that both computing device(s) 110 and smart sensor(s) 300 may comprise sensors, or computing device 110 may comprise no sensors, with only smart sensor(s) 300 comprising sensor(s), and further, that the method steps described herein may be carried out by any suitable combination of computing device(s) 110, smart sensor(s) 300 and/or server 140. It will further be appreciated that the computer-executable instructions described herein may reside within or on memory 200 of computing device(s) 110, memory 330 of smart sensor(s) 300, or memory 610 of server 140, or may be distributed amongst memory 200, memory 330 and/or memory 610. Furthermore, it will be appreciated that smart sensor(s) 300 may communicate with computing device(s) 110 only and/or with other smart sensor(s) 300 and/or server 140.

Sensor(s) 240, 300 may comprise presence or proximity sensors, detection and ranging (DAR) sensors, speed measurement sensors, volumetric sensors, electrical usage sensors, gas usage sensors, water usage sensors, and any other sensor type suitable for use with the method(s) described herein. It will be appreciated that network-connected device(s) 130 may comprise the instructions or logic necessary to monitor their own usage (of, e.g., electricity, gas or water) and convey this information to computing device(s) 110 and/or server 140, and that such information may be pushed from device(s) 130 or pulled therefrom by computing device(s) 110 and/or server 140. In such cases, it may not be necessary for computing device(s) 110 to include sensor(s) 240, or for system 100 to comprise smart sensor(s) 300.

Server 140 of system 100 may represent a system of known components, including additional servers, databases, I/O devices, access terminals, communications pathways, and any other components necessary in order for server 140 to effect method step(s) described herein, as would be known to the person of skill in the art. System 100 may also comprise additional servers 140 for redundancy. As a non-limiting example, server 140 may comprise and communicate to computing device(s) 110 and/or smart sensor(s) 300 (by pushing or having pulled therefrom) allocation information of any kind suitable for the method(s) described herein. As a non-limiting example, server 140 may be a financial server hosting a financial software application of a financial institution, such as a bank, and a user of system 100, including of computing device(s) 110 and/or sensor(s) 300, may have or have access to (e.g., through a client web portal or an "app" on computing device 110 or on another device (e.g., a mobile device) of the user) the financial application hosted by server 140. Such financial application may monitor monetary debit and credit transactions in accounts of the user, aggregate and sort the monitored account data, and provide to the user a report of the user's financial transactions for a certain time period. For example, such reports may show income and expenditures on a monthly basis, aggregated and sorted by industry or type (e.g., amount spent on food, gasoline, clothing, etc.). Such applications may also provide a mechanism for establishing a budget for a certain time period, in which case the reports may include information on whether a budget has been met, including information on the extent of variance from a budget. In such cases, allocation information may include an allocation that is a budget established by the user for a certain time period (e.g., monthly) using the financial application of server 140. As another example, the allocation may be an average or otherwise determined expenditure amount for a time period (e.g., average monthly expenditures) automatically determined by the financial application. As such, the allocation information, financial information and the one or more accounts may each be associated with a user of the computing device(s) 110 and/or smart sensor(s) 300, and the financial information may thus include credit and/or debit information for the account(s) of the user.

Figure 5:
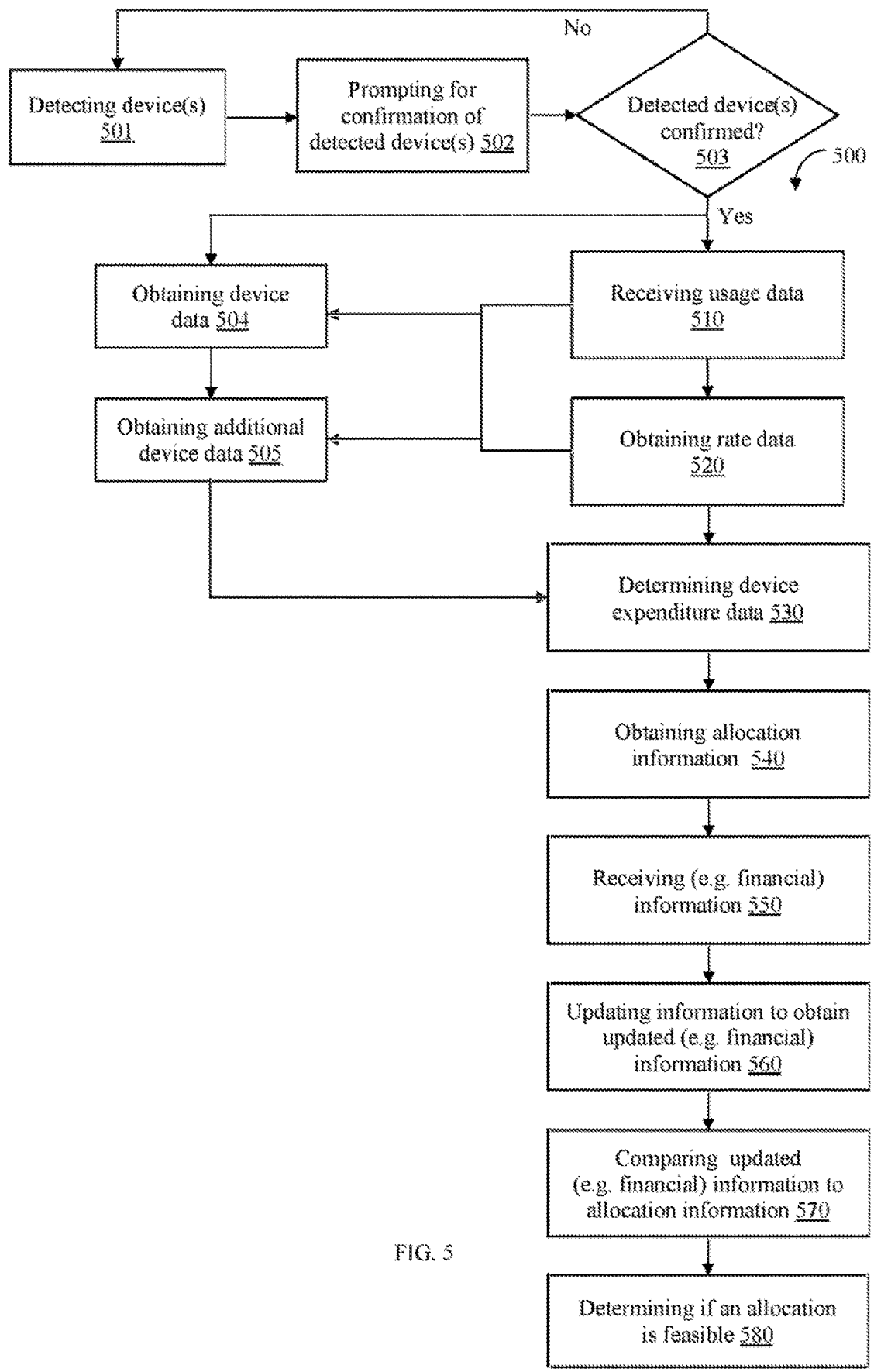
FIG. 5 depicts a flow diagram of an exemplary aspect of computer-executable instructions described herein.

Referring to FIG. 5, in accordance with an exemplary aspect of the present application, the instructions when executed by the processor(s) 250, server processor(s) 620 and/or microcontroller(s) 340 cause the processor(s) to carry out steps of method 500, including receiving 510, via the communication module 210 (and/or communication module 630) over the network 120, usage data associated with at least one of network-connected device(s) 130; obtaining 520 rate data associated with the at least one of the network-connected device(s) 130, which may represent, as an example, a monetary amount per unit time for use of the at least one of the network-connected device(s), although the rate may comprise non-monetary information; determining 530, for the at least one of the network-connected device(s) 130, device expenditure data based on the rate data and the usage data; obtaining 540 allocation information, which may pertain to a time period and which may be in respect of at least the at least one of the network-connected device(s) 130; receiving 550, via the communication module 210 over network 120 from server 140, information, which may include data associated with one or more data files, including, as an example only, receiving information from a server 140 of a financial institution, such as a financial server of a bank, in which case the information may comprise financial information, such as budget information, and the one or more data files may include one or more accounts; updating 560 the information, for example, financial information, with the device expenditure data for the at least one network-connected device(s) 130, to obtain updated information, such as updated financial information; comparing 570 the updated information (e.g., updated financial information) to the allocation information; and determining 580, based on the comparison of the updated information (e.g., updated financial information) to the allocation information whether an allocation (such as a budget) indicated by the allocation information for the time period is feasible.

It will be appreciated that in aspects of the present application not having computing device(s) 110 (such as where network-connected device(s) 130 and/or smart sensor(s) 300 communicate directly with server(s) 140), the steps of method 500 (and method 700, described below) may be accordingly altered to account for the system not having computing device(s) 110. For example, step 550, comprising receiving information, such as financial information, from server 140 over network 120 via communication module 210, may not require the receiving of the information to take place over the network 120, nor via communication module 210. In such a scenario, the step 550 may comprise the step of obtaining information, for example financial information, including data associated with one or more accounts (e.g., budget information).

Still with reference to FIG. 5, where sensor(s) 240 and/or smart sensor(s) 300 are employed and are configured for sensing the at least one network-connected device(s) 130, method 500 may further include the step of detecting 501, via sensor(s) 240 and/or smart sensor(s) 300, the at least one of the network-connected device(s) 130. The instructions when executed by processor(s) 240, server processor(s) 620 and/or microcontroller(s) 340 may further cause the processor(s) and/or microcontroller(s) to display on display 220 of computing device 110 (or on a display of another device (e.g., a mobile device, computer, tablet, etc.) by which a graphical user interface of an application hosted by server 140, such as the financial application described above, is accessed) a prompt in order to prompt 502 for a confirmation of the detected network-connected device(s). Manual confirmation of detected or otherwise identified network-connected device(s) 130 is expected to reduce the rate of errors in identifying network-connected device(s) 130. At step 503, where the identification of a network-connected device is not confirmed, the instructions may further comprise instructions that when executed cause the respective processor(s) to re-detect 501 or otherwise re-identify the network-connected device, and where the identification is confirmed, the method may proceed to step 504.

Computing device(s) 110, smart sensor(s) 300 and/or server(s) 140 may include instructions on their respective memories 200, 330, 610 which enable processor(s) 240, microcontroller(s) 340 and/or server processor(s) 620 to interpret any communication protocol(s) being used by the network-connected device(s) to obtain 504 and store in memory 200, memory 330 and/or memory 610 device data associated with the network-connected device(s) 130. Such communication protocols may include, for example, any communication protocols designed or suitable for, or capable of use with, the Internet of Things (IoT) and network-connected device(s) 130 connected to the IoT, including but not limited to those communication types and protocols described herein. Device data may include, for example, usage data and/or rate data for the network-connected device(s) 130.

The instructions when executed by processor(s) 240, server processor(s) 620 and/or microcontroller(s) 340 may also cause the processor(s) and/or microcontroller(s) to display on display 220 of computing device 110 (or on a display of another device (e.g., a mobile device, computer, tablet, etc.) by which a graphical user interface of an application hosted by server 140, such as the financial application described above, is accessed, as would be the case, for example, where the instructions are executed by microcontroller(s) 340 of smart sensor(s) 300) a prompt for entry of additional device data associated with the network-connected device(s) 130, to thereby obtain 505 the additional device data. Whether additional device data is entered or not, method 500 may thereafter proceed to step 530. Additional device data may comprise, for example, one or more of a name, a location and the rate data associated with the network-connected device(s), such as where the rate data does not comprise part of the device data. As an example, where IoT-connected light fixtures are detected by a computing device 110 (or alternatively, their information is pushed to computing device 110 or, e.g., subscribed to by computing device 110 using a communication protocol such as MQTT™), a user may be prompted to enter a name or alias to help the user correctly and more easily identify each such detected light fixture and may, for example, name each detected light fixture "Kitchen Light" and "Family Room Light". In an alternative aspect of the present application, additional device data may include an optional entry for rate data even where the device data includes rate data, in which case manually entered rate data may override the rate data provided as part of the device data. This is expected to be useful for forecasting expenditures associated with anticipated rate increases, or in situations where it is known that the rate data provided as part of the device data is outdated. In yet a further example aspect of the present application, and with reference to FIG. 1, the rate data associated with the network-connected device(s) 130 may be obtained by computing device 110 and/or server 140 over network 120 from a third party server 150 hosting rate information for the network-connected device(s) 130. Computing device(s) 110 and/or server 140 may access server 150 using private or public APIs (application programming interfaces).

Referring to the step 540 of obtaining allocation information, the instructions when executed may cause processor(s) 240, server processor(s) 620 and/or microcontroller(s) 340 to display on a display 220 of computing device 110 (or on a display of another device (e.g., a mobile device, computer, tablet, etc.) by which a graphical user interface of an application hosted by server 140, such as the financial application described above, is accessed) a prompt for the allocation information, which may be for a time period. As described above, this may include, as a non-limiting example, a monthly budget. Alternatively, the allocation information for the time period may be obtained over network 120 from server 140. In another aspect, the instructions when executed may prompt for allocation information even where allocation information has been provided by server 140, in which case the manually entered allocation information may override the allocation information obtained from server 140.

The instructions when executed may further cause processor(s) 240, server processor(s) 620 and/or microcontroller(s) 340 to determine one or more savings options for meeting the allocation, each of the savings option(s) comprising one or more altered usage pattern(s) for the network-connected device(s) 130. In the example scenario described above, where the allocation is a budget manually entered or obtained or received from a financial server 140, an altered usage pattern of a savings option may comprise a reduced usage pattern for a lighting fixture and/or a washing machine, for example, in order to help maintain the allocation or budget for the relevant time period (e.g., a month).

A savings option may mean a savings with respect to usage that alone or in combination with other factors (e.g., other account data, such as monthly expenditures, not related to the usage of the network-connected device(s) 130) exceeds an allocation, or it may mean a savings with respect to usage that alone or in combination with other factors is under a minimum allocation. With respect to the latter, using the vehicle testing example described above, a network-connected device or vehicle 130 requiring as an allocation a certain minimum number of miles driven per day as part of road-testing, and which comes under or is on track to come under that minimum allocation or number of miles/day, may result in a savings option comprising an altered usage pattern having an increased usage of the vehicle per day.

Figure 7:
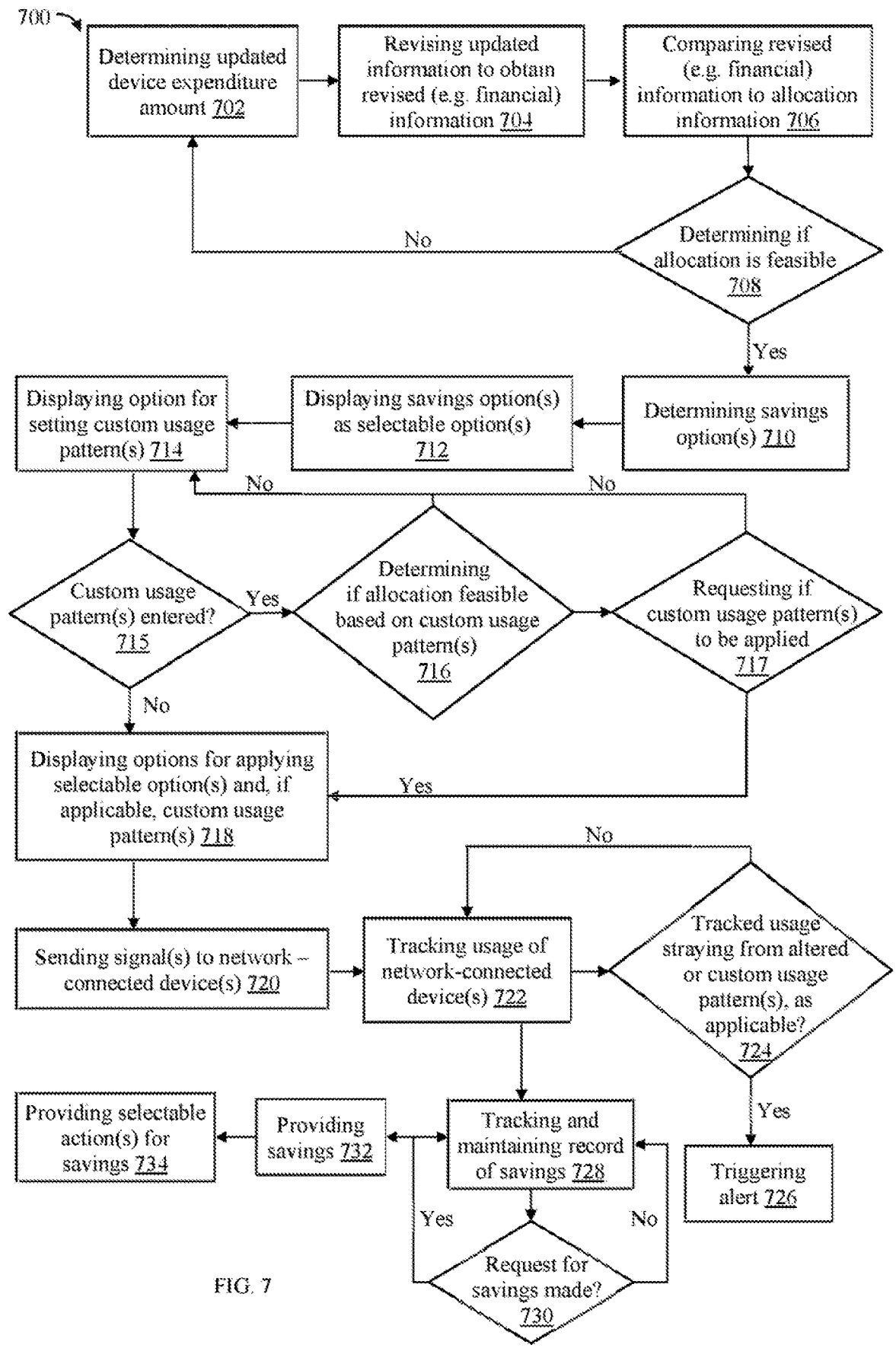
FIG. 7 depicts a flow diagram of another exemplary aspect of computer-executable instructions described herein.

Referring to FIG. 7, the instructions when executed cause the processor(s) 240, server processor(s) 620 and/or microcontroller(s) 340 to determine 710 each of the savings option(s) by carrying out steps of method 700, including: determining 702, for the network-connected device(s) 130, an updated device expenditure amount based on the rate data and the altered usage pattern(s); revising 704 the updated information (e.g., updated financial information) with the updated device expenditure amount for the network-connected device(s), to obtain revised information (e.g., revised financial information); comparing 706 the revised information (e.g., revised financial information) to the allocation information; and determining 708, based on the comparison of the revised information (e.g., revised financial information) to the allocation information, if the allocation for the time period is feasible. Where it is determined that the allocation for the time period would not be feasible, method 700 may return to step 702 to begin method 700 again based on one or more other altered usage pattern(s). Each of the savings options comprises one or more of the altered usage pattern(s) for which it is determined that the allocation for the time period is feasible. An allocation determined to be feasible for a time period is an allocation that can be met or achieved for that time period.

For example, one savings option may include a reduced usage pattern for a light fixture, another savings option may include a reduced usage pattern for a dishwasher, and yet another savings option may include a reduced usage pattern for both the light fixture and the dishwasher. The combined reduced usage pattern may represent the sum of the individual reduced usage patterns comprising the individual savings options for those devices, or some other reduction in usage. For example, an altered usage pattern comprising a combined reduced usage for a plurality of devices may represent a total reduction in usage that is the same or similar in amount to a savings option having only a single altered (e.g., reduced) usage pattern, to distribute the burden of reducing usage amongst the network-connected devices 130 covered by the combined savings option to thereby lessen the extent of reduced usage for each device individually. A variance from the allocation may also be determined and displayed in real-time upon the selection of one or more of the savings option(s) (e.g., an expected total monthly expenditure amount based on the selected savings option(s) and possibly other factors (e.g., other account data, such as monthly expenditures, not related to the usage of the network-connected device(s) 130).

The instructions when executed may further cause the processor(s) 240, server processor(s) 620 and/or microcontroller(s) 340 to display 712 on display 220 of computing device 110 (or on a display of another device (e.g., a mobile device, computer, tablet, etc.) by which a graphical user interface of an application hosted by server 140, such as the financial application described above, is accessed) the one or more savings options as selectable options, and optionally, may further cause to be displayed 714 an option for manually setting one or more custom usage patterns for at least one of the network-connected device(s) 130. At step 715, it is determined if a custom usage pattern(s) is manually entered, and if not, method 700 may proceed to step 718. Where one or more custom usage pattern(s) are entered, the instructions, when executed, may further cause the processor(s) 240, server processor(s) 620 and/or microcontroller(s) 340, for each of the network-connected device(s) 130 for which a respective custom usage pattern is manually set, to determine 716 substantially in real-time upon the manual setting of the respective custom usage pattern, if the allocation for the time period is feasible by use of the respective custom usage pattern. A variance from the allocation may also be determined and displayed in real-time upon the setting of one or more custom usage pattern(s), as described above with respect to the selection of savings option(s). If it is determined that the allocation is not feasible using a custom usage pattern, method 700 may return to step 714, and where it is determined that the allocation is feasible using the custom usage pattern, the instructions when executed may further cause to be displayed a prompt requesting 717 if the custom usage pattern is to be applied. Where the custom usage pattern is to be applied, method 700 may proceed to step 718, and where the custom usage pattern is not to be applied, method 700 may return to step 714.

Further, the instructions when executed may also cause to be displayed 718 options for applying each of the selectable options and, where applicable, manually set custom usage pattern(s). Such options may include, for example, applying the selected savings option(s) and/or custom usage pattern(s) for a single time period (e.g., the current month only, the next month only, the current week only, etc.), or on a recurring basis, with or without an end date (e.g. monthly and indefinitely, or monthly until a specific date, or monthly with a number of months specified, etc.). Such options may also include applying multiple savings options in a default order or prioritized list that is displayed, or alternatively, according to another order representing a prioritized list manually set by a user, as would be applicable where the user wishes to apply a plurality of savings options but not in parallel, such that only one savings option is applied at any one time so as to not reduce usage of multiple network-connected devices simultaneously. As not all network-connected devices run in an "always on" state (as further described below), the instructions when executed may apply the selected savings option(s) and/or custom usage pattern(s) to a prioritized device 130 when it is on, and when it is off, apply any applicable savings option(s) and/or custom usage pattern(s) to a device 130 that is on (whether running in an "always on" state, or manually turned on for a time period) and that is next in priority in the default or manually set prioritized list.

When a selection of any of the savings option(s) and/or the custom usage pattern(s) is received, the instructions when executed may further cause the processor(s) 240, server processor(s) 620 and/or microcontroller(s) 340 to send 720 via the communication module 210 (and/or communication module 630) over network 120 a signal to each of the network-connected device(s) 130 affected by the selected savings option(s) and/or custom usage pattern(s). Each of the signals causes each of the affected network-connected devices to operate in accordance with the respective altered usage pattern or custom usage pattern, as applicable, that has been selected, as well as in accordance with any selected options for applying the savings option(s) and/or custom usage pattern(s), as described above. For example, upon the selection of a savings option to reduce a network-connected thermostat temperature by 1° F. for a month, a signal carrying instructions for the altered usage pattern would be formed in a language understandable by a processor or microcontroller of the thermostat, and transmitted to the thermostat, which would then process the instructions and accordingly alter its temperature setting for a month.

Alternatively, or additionally, the savings option(s) and/or custom usage pattern(s), when selected, may result in the instructions, when executed by the processor(s), causing usage of the affected device(s) 130 to be tracked 722 against the selected altered or custom usage pattern(s). Where it is determined 724 that usage of the tracked device(s) strays from the altered or custom usage pattern(s) selected, the instructions when executed may further trigger an alert 726 which indicates that usage is above (or below, if applicable) a target usage (i.e., the altered or custom usage pattern). The alert may comprise, for example, an audible and/or visual alert displayed on a display 220 (or on a display of another device (e.g., a mobile device, computer, tablet, etc.) by which a graphical user interface of an application hosted by server 140, such as the financial application described above, is accessed) or a message sent via communication module 210 or communication module 630 to a digital address of a user of computing device(s) 110, smart sensor(s) 300 and/or server 140 (e.g., SMS, MMS, instant message, email, a proprietary message type, etc.). It will be appreciated by the person skilled in the art that any suitable type of alert or alert message may be used.

The instructions when executed may further cause the processor(s) 240, server processor(s) 620 and/or microcontroller(s) 340 to track and maintain 728 a record, in memory

200 and/or memory 610, of savings resulting from the selection of any of the savings option(s) and/or the custom usage pattern(s). As such, it is expected that a user may request from computing device 110 and/or server 140 real-time savings data relating to the usage of one or more network-connected device(s) 130 in accordance with one or more altered and/or custom usage pattern(s). Where it is determined 730 that a request for real-time savings data has been made, the instructions when executed may cause the savings to be provided 732 in real-time, upon request 730, such as by being displayed on display 220 of computing device 110 (or on a display of another device (e.g., a mobile device, computer, tablet, etc.) by which a graphical user interface of an application hosted by server 140, such as the financial application described above, is accessed). It will be appreciated that where it is described herein that information is displayed on display 220 or some other display, the present application is not to be limited by the described mode of presentation, and that other means for presenting information, such as by text or audio messaging, may be used. Furthermore, input(s) need not be via touch-sensitive display, but may alternatively, or additionally, comprise input by text entry, messaging, audio (e.g., voice command), and any other suitable means for carrying out method step(s) described herein.

The instructions when executed by the processor(s) may further cause the processor(s) 240, server processor(s) 620 and/or microcontroller(s) 340 to provide 734, such as by displaying on display 220 (or on a display of another device (e.g., a mobile device, computer, tablet, etc.) by which a graphical user interface of an application hosted by server 140, such as the financial application described above, is accessed), one or more selectable actions for the savings resulting from the selection of any of the savings option(s) and/or custom usage pattern(s). The selectable action(s) may include, for example, depositing the savings into one or more of the account(s) via server 140 (e.g., financial server 140). For example, a user may select an action comprising the deposit of savings into a savings account, a chequing account, an education savings fund, an investment instrument, and so on.

The instructions when executed by the processor(s) may cause processor(s) 620 to update the information (e.g., financial information) to account for the altered and/or custom usage pattern(s) selected. As such, expenditure amounts associated with the altered and/or custom usage pattern(s) may be reflected in any future report(s), chart(s) or other format for data presentation produced by an application (e.g., a financial application) hosted by server(s) 140.

It is expected that the described system(s), computing device(s) and method(s) may allow for real-time or substantially real-time monitoring of the usage of network-connected device(s) and to track such usage in real-time against an allocation. An expected advantage of the ability to acquire such usage information in real-time is that variances from an allocation (e.g. excessive usage of a washing machine in view of a monthly budget) may be adjusted in accordance with the allocation in an attempt to avoid, for example, spending more than the set budget. This is preferable to the approach of adjusting usage patterns only after having been invoiced for the device usage, by which time the excess device use has already taken place, and the related costs have already been incurred. The aspects of the present application described and claimed herein are expected to provide information, from which it may be determined that adjustments in device usage may be required in order for an allocation to be feasible or to facilitate the feasibility of an allocation, sooner than would otherwise be possible.

As used herein, including in the claims appended hereto, the terms "computing device", "computing devices" or "computing device(s)" may include any combination of the described computing device(s) 110, smart sensor(s) 300 and/or server(s) 140 that may be used to carry out method step(s) described herein.

While the foregoing has been described in some detail for purposes of clarity and understanding, it will be appreciated by those skilled in the relevant arts, once they have been made familiar with this disclosure, that various changes in form and detail can be made without departing from the true scope of the appended claims. The present application is therefore not to be limited to the exact components or details of methodology or construction set forth above. Except to the extent necessary or inherent in the processes themselves, no particular order to steps or stages of methods or processes described in this disclosure, including in the Figures, is intended or implied. In many cases the order of process or method steps may be varied, and or made sequential or parallel, without changing the purpose, effect, or import of the method(s) described.

The invention claimed is:

1. A computing device for monitoring and managing usage of one or more network-connected devices over a network, the computing device comprising:
   a memory storing computer-executable instructions;
   a communication module for communication with said one or more network-connected devices via the network; and
   at least one processor coupled to the memory and the communication module, the instructions when executed by the at least one processor causing the at least one processor to:
      determine, for the at least one of said one or more network-connected devices, device expenditure data based at least on usage data associated with the at least one of said one or more network-connected devices;
      compare the device expenditure data to allocation information pertaining to a time period;
      determine, based on the comparison of the device expenditure data to the allocation information, whether an allocation indicated by the allocation information for the time period is feasible, and
      determine, if the allocation for the time period is not feasible, one or more savings options, each of said one or more savings options comprising one or more altered usage patterns for the at least one of said one or more network-connected devices,
   wherein the instructions, when executed by the at least one processor, further cause the at least one processor to determine each of the one or more savings options by causing the processor to:
      determine, for the at least one of said one or more network-connected devices, an updated device expenditure amount based at least on the one or more altered usage patterns,
      compare the updated device expenditure amount to the allocation information, and
      determine, based on the comparison of the updated device expenditure amount to the allocation information, if the allocation for the time period is feasible.

2. The computing device of claim 1 wherein the instructions when executed by the at least one processor further cause the at least one processor to:
receive via the communication module over the network from a server information, the information including data associated with one or more data files;
update the information with the device expenditure data for the at least one of said one or more network-connected devices, to obtain updated information; and
revise the updated information with the updated device expenditure amount for the at least one of said one or more network-connected devices, to obtain revised information.

3. The computing device of claim 2 wherein:
the comparison of the device expenditure data to the allocation information pertaining to the time period comprises a comparison of the updated information to the allocation information pertaining to the time period; and
the comparison of the updated device expenditure amount to the allocation information pertaining to the time period comprises a comparison of the revised information to the allocation information pertaining to the time period;
wherein the information includes financial information, the one or more data files include one or more accounts, and each of the allocation information, the financial information and the one or more accounts is associated with a user of the computing device.

4. The computing device of claim 2 wherein the instructions when executed by the at least one processor further cause the at least one processor to obtain the allocation information over the network from the server.

5. The computing device of claim 1 further comprising one or more sensors communicatively coupled to said at least one processor and configured for sensing the at least one of said one or more network-connected devices, wherein the instructions, when executed by the at least one processor, further cause the at least one processor to detect, via the one or more sensors, the at least one of said one or more network-connected devices.

6. The computing device of claim 5 wherein the instructions, when executed by the at least one processor, enable the at least one processor to interpret one or more "Internet of Things" (IoT) communication protocols to obtain and store in said memory device data associated with the at least one of said one or more network-connected devices.

7. The computing device of claim 6 wherein the instructions, when executed by the at least one processor, further cause the at least one processor to display on a display of the computing device a prompt for entry of additional device data associated with the at least one of said one or more network-connected devices.

8. The computing device of claim 7 wherein the additional device data comprises one or more of a name, a location and rate data associated with the at least one of said one or more network-connected devices.

9. The computing device of claim 6 wherein the device expenditure data is further based on rate data associated with the at least one of said one or more network-connected devices, and wherein the device data includes the rate data.

10. The computing device of claim 5 wherein the instructions, when executed by the at least one processor, further cause the at least one processor to display on a display of the computing device a prompt for a confirmation of the detected at least one of said one or more network-connected devices.

11. The computing device of claim 1 wherein the instructions, when executed by the at least one processor, further cause the at least one processor to display on a display of the computing device a prompt for the allocation information for the time period.

12. The computing device of claim 1 wherein the instructions, when executed by the at least one processor, further cause the at least one processor to display on a display of the computing device the one or more savings options as selectable options.

13. The computing device of claim 12 wherein the instructions, when executed by the at least one processor, further cause the at least one processor to display on the display of the computing device an option for setting one or more custom usage patterns for at least one of said one or more network-connected devices, and wherein the instructions, when executed by the at least one processor, further cause the at least one processor, for each of the at least one of said one or more network-connected devices for which a respective one of said one or more custom usage patterns is set, to determine, upon said setting of the respective custom usage pattern, substantially in real-time, if the allocation for the time period is feasible by use of the respective custom usage pattern.

14. The computing device of claim 13 wherein the instructions, when executed by the at least one processor, further cause the at least one processor to display on the display of the computing device options for applying each of the selectable options and each said set custom usage pattern for a single time period or on a recurring basis.

15. The computing device of claim 14 wherein when a selection of any of the one or more savings options and said one or more custom usage patterns is received, the instructions, when executed by the at least one processor, further cause the at least one processor to send via the communication module over the network a signal to each of the at least one of said one or more network-connected devices affected by the selected one or more savings options and/or the selected one or more custom usage patterns, each said signal causing each said affected network-connected device to operate in accordance with the respective one or more altered usage patterns or the respective custom usage pattern.

16. The computing device of claim 15 wherein the instructions, when executed by the at least one processor, further cause the at least one processor to track and maintain a record, in the memory, of savings resulting from the selection of any of the one or more savings options and/or the one or more custom usage patterns.

17. The computing device of claim 16 wherein the instructions when executed by the at least one processor further cause the at least one processor to:
receive via the communication module over the network from a server information, the information including data associated with one or more data files;
update the information with the device expenditure data for the at least one of said one or more network-connected devices, to obtain updated information; and
revise the updated information with the updated device expenditure amount for the at least one of said one or more network-connected devices, to obtain revised information,
wherein:
the comparison of the device expenditure data to the allocation information pertaining to the time period comprises a comparison of the updated information to the allocation information pertaining to the time period; and the comparison of the updated device expenditure amount to the allocation information pertaining to the time period comprises a comparison of the revised information to the allocation information pertaining to the time period; and wherein the information includes financial information, the one or more data files include one or more accounts, and the instructions, when executed by the at least one processor, further cause the at least one processor to display on the display of the computing device one or more selectable actions for the savings resulting from the selection of any of the one or more savings options and/or the one or more custom usage patterns, the one or more selectable actions including depositing the savings into one or more of the one or more accounts via the server.

18. The computing device of claim 16 wherein the instructions, when executed by the at least one processor, further cause the at least one processor to display on the display of the computing device, upon a request, the savings in substantially real-time.

19. A method of monitoring and managing usage of one or more network-connected devices over a network by a computing device, the computing device comprising at least one processor coupled to a memory and a communication module, the method comprising:

determining, for the at least one of said one or more network-connected devices, device expenditure data based at least on usage data associated with the at least one of said one or more network-connected devices;

comparing the device expenditure data to allocation information pertaining to a time period;

determining, based on the comparison of the device expenditure data to the allocation information, whether an allocation indicated by the allocation information for the time period is feasible, and determining, if the allocation for the time period is not feasible, one or more savings options, each of said one or more savings options comprising one or more altered usage patterns for the at least one of said one or more network-connected devices, wherein each of the one or more savings options is determined by:

determining, for the at least one of said one or more network-connected devices, an updated device expenditure amount based at least on the one or more altered usage patterns, comparing the updated device expenditure amount to the allocation information, and determining, based on the comparison of the updated device expenditure amount to the allocation information, if the allocation for the time period is feasible.

20. A non-transitory computer-readable medium for monitoring and managing usage of one or more network-connected devices over a network, the computer-readable medium comprising computer-executable instructions for:

determining, for the at least one of said one or more network-connected devices, device expenditure data based at least on usage data associated with the at least one of said one or more network-connected devices;

comparing the device expenditure data to allocation information pertaining to a time period;

determining, based on the comparison of the device expenditure data to the allocation information, whether an allocation indicated by the allocation information for the time period is feasible, and determining, if the allocation for the time period is not feasible, one or more savings options, each of said one or more savings options comprising one or more altered usage patterns for the at least one of said one or more network-connected devices, wherein the computer-readable medium further comprises computer-executable instructions for determining each of the one or more savings options by:

determining, for the at least one of said one or more network-connected devices, an updated device expenditure amount based at least on the one or more altered usage patterns, comparing the updated device expenditure amount to the allocation information, and determining, based on the comparison of the updated device expenditure amount to the allocation information, if the allocation for the time period is feasible.

* * * * *